UNITED STATES PATENT OFFICE.

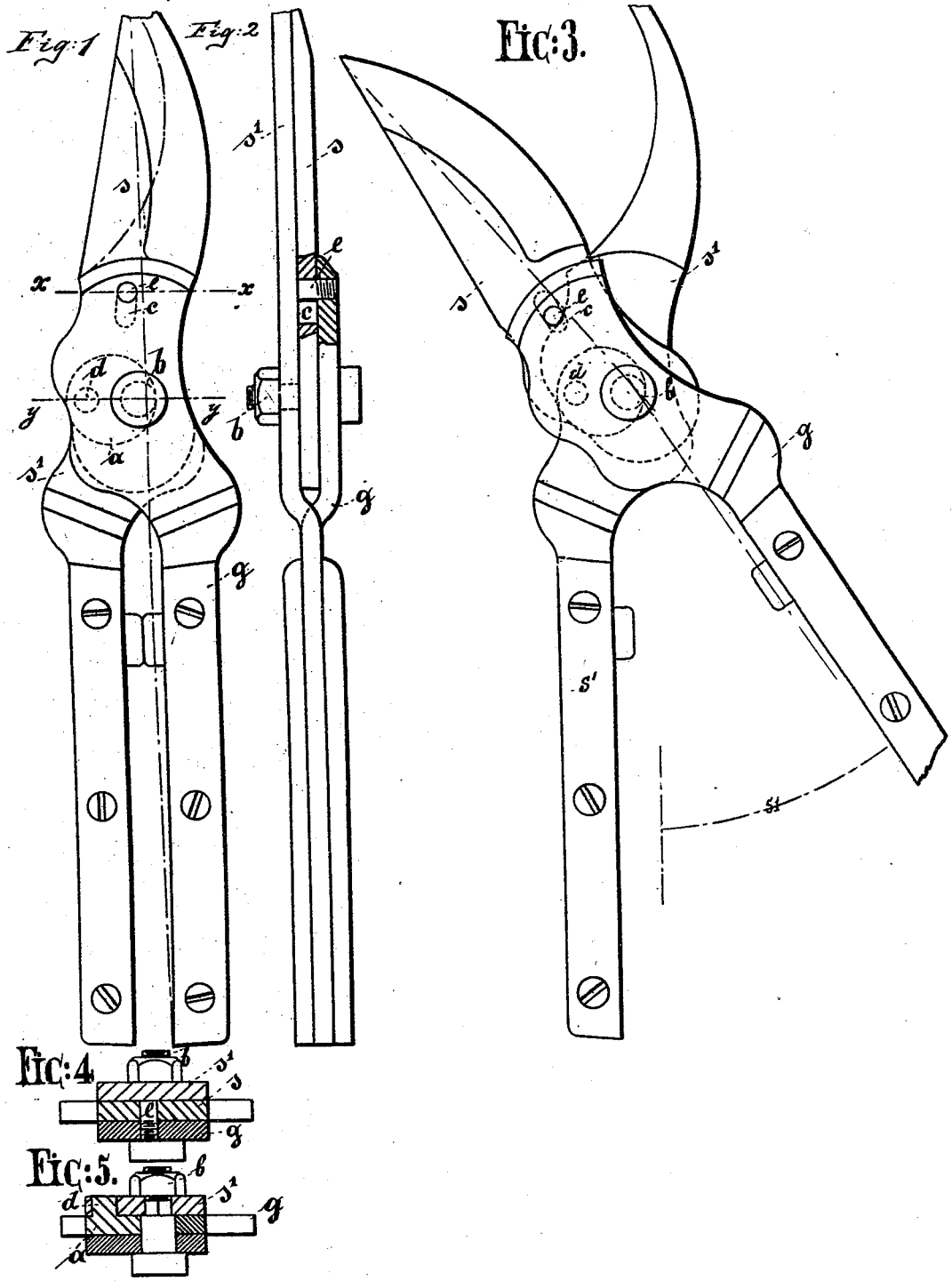

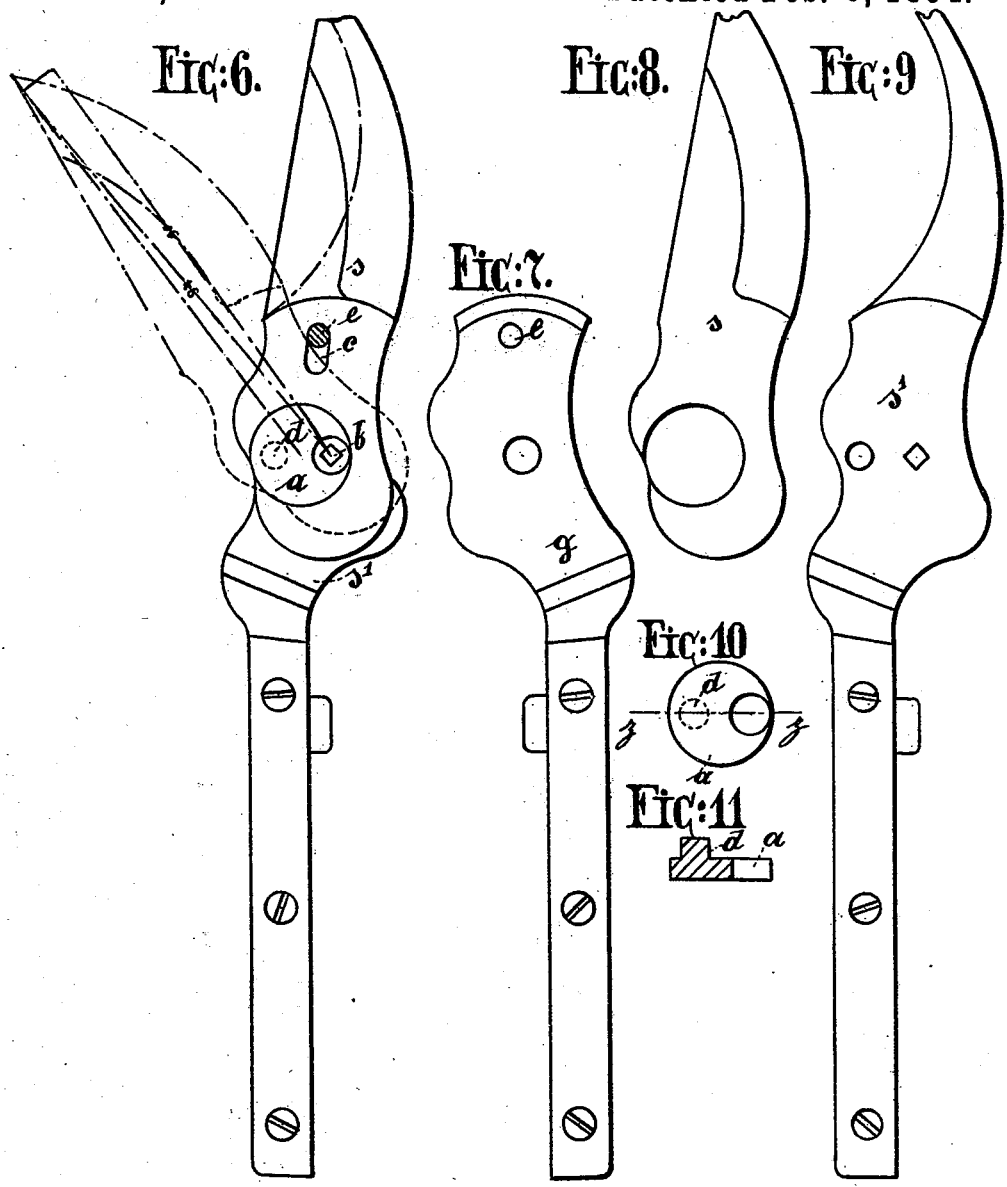

PETER KAMPHAUS, OF WALD, GERMANY.

SCISSORS OR SHEARS.

SPECIFICATION forming part of Letters Patent No. 514,082, dated February 6, 1894.

Application filed August 8, 1893. Serial No. 482,636. (No model.)

*To all whom it may concern:*

Be it known that I, PETER KAMPHAUS, a subject of the German Emperor, residing at Wald, near Solingen, Germany, have invented certain new and useful Improvements in Scissors or Shears, with description as follows.

This invention relates to that class of scissors and shears which make a drawing cut and has for its object more particularly, to so construct the scissors and shears that they are not apt to work loose, but will always work positively and accurately.

In the accompanying drawings: Figure 1 is a side view of a pair of scissors or shears constructed according to my invention and showing them closed; Fig. 2 an end view thereof, partly in section; Fig. 3 a side view showing them open; Fig. 4 a cross section on line $x, x$, Fig. 1; Fig. 5 a cross section on line $y, y$, Fig. 1; Fig. 6 a side view of the shears with handle $g$, removed; Fig. 7 a side view of handle $g$; Fig. 8 a side view of blade $s$; Fig. 9 a side view of blade and handle $s'$; Fig. 10 a face view of disk $a$, and Fig. 11 a section on line $z, z$, Fig. 10.

The letter $g$, represents the handle of a shear blade $s$, which is disconnected or has an independent motion, while the other blade and handle $s'$, are connected or have a joint motion.

Within the blade $s$, there is formed a circular opening for the reception of a revoluble eccentric disk $a$. This disk is perforated out of center for the reception of the main connecting pivot $b$. The blade $s$, is provided, moreover, with an elongated guide slit $c$, which is engaged by a pin $e$, secured to handle $g$, but this guiding mechanism may be differently constructed. The pivot $b$, is either rigidly connected with the part $s'$, to impart motion to disk $a$, or such disk is moved by a pin or projection $d$, engaging a perforation in part $s'$. If the shears are opened and closed, the disk $a$, will turn, and as it is arranged eccentrically to the pivot $b$, the blade $s$, will not only be revolved, but it will also be moved toward and away from its handle to produce a drawing cut.

The improvement may be applied to scissors and shears of all kinds.

What I claim is—

The combination of a blade having a circular opening with an independently movable handle, a guide pin connecting the parts, a circular disk within the circular opening and a main pivot passing eccentrically through the disk and connecting the two shear blades, substantially as specified.

In testimony whereof I have signed this specification in the presence of two subscribing witnesses.

PETER KAMPHAUS.

Witnesses:
 HANS FRIEDRICH,
 AUGUST VON PAPEN.